US009287964B2

(12) United States Patent
Stephens et al.

(10) Patent No.: US 9,287,964 B2
(45) Date of Patent: Mar. 15, 2016

(54) MILLIMETER-WAVE RELAY DEVICE WITH BOUNDED DELAY AND METHOD FOR RETRANSMISSION OF SYMBOLS

(71) Applicant: Intel Corporation, Santa Clara, CA (US)

(72) Inventors: Adrian P. Stephens, Cottenham (GB); Carlos Cordeiro, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/792,330

(22) Filed: Mar. 11, 2013

(65) Prior Publication Data

US 2014/0254469 A1      Sep. 11, 2014

(51) Int. Cl.
*H04B 7/15* (2006.01)
*H04W 88/04* (2009.01)

(52) U.S. Cl.
CPC ..... *H04B 7/15* (2013.01); *H04W 88/04* (2013.01)

(58) Field of Classification Search
USPC ......................................... 370/492, 310–350
See application file for complete search history.

(56) References Cited

U.S. PATENT DOCUMENTS

| 7,339,979 | B1 * | 3/2008 | Kelkar | 375/147 |
|---|---|---|---|---|
| 8,023,400 | B2 * | 9/2011 | Jung | 370/210 |
| 9,042,294 | B2 * | 5/2015 | Tsai et al. | 370/315 |
| 2004/0095907 | A1 | 5/2004 | Agee et al. | |
| 2006/0115015 | A1 | 6/2006 | Oh et al. | |
| 2006/0251013 | A1 * | 11/2006 | Roy et al. | 370/329 |
| 2009/0022082 | A1 * | 1/2009 | Taori et al. | 370/315 |
| 2009/0262678 | A1 | 10/2009 | Oyman et al. | |
| 2010/0067427 | A1 * | 3/2010 | Choudhury | 370/315 |
| 2010/0266287 | A1 | 10/2010 | Adhikari et al. | |
| 2010/0284446 | A1 | 11/2010 | Mu et al. | |

(Continued)

FOREIGN PATENT DOCUMENTS

| CN | 104981988 A | 10/2015 |
|---|---|---|
| TW | 200644477 A | 12/2006 |

(Continued)

OTHER PUBLICATIONS

"International Application Serial No. PCT/US2014/020300, International Search Report mailed Jun. 26, 2014", 6 pgs.

(Continued)

*Primary Examiner* — Warner Wong
(74) *Attorney, Agent, or Firm* — Schwegman Lundberg & Woessner, P.A.

(57) ABSTRACT

Embodiments of a wireless station to operate as a per-symbol relay device and method for retransmission of symbols between client devices and a master device using millimeter-wave links is generally disclosed herein. In some embodiments, the relay device may receive one or more of independent symbol streams from the master device. Each independent symbol stream may comprise packets that include groups of one or more symbols. Each group within a packet may be destined for a different one of the client devices. The relay device may separately decode each symbol or group of symbols to generate an independent stream of symbols for retransmission to the client devices using beamforming. The relay device may be arranged to receive, decode, and retransmit each symbol or group of symbols within a delay that is bounded by the number of symbols in the group.

22 Claims, 2 Drawing Sheets

(56) References Cited

U.S. PATENT DOCUMENTS

| | | | |
|---|---|---|---|
| 2011/0096717 A1* | 4/2011 | Kim et al. | 370/315 |
| 2011/0103296 A1* | 5/2011 | Ji et al. | 370/315 |
| 2011/0159805 A1* | 6/2011 | Hart | 455/9 |
| 2011/0194483 A1* | 8/2011 | Ji et al. | 370/315 |
| 2011/0250897 A1* | 10/2011 | Seo et al. | 455/445 |
| 2012/0039239 A1* | 2/2012 | Park et al. | 370/315 |
| 2012/0076070 A1* | 3/2012 | Takano | 370/315 |
| 2012/0140702 A1* | 6/2012 | Takano | 370/315 |
| 2012/0207084 A1* | 8/2012 | Seo et al. | 370/315 |
| 2012/0263210 A1* | 10/2012 | Panah et al. | 375/211 |
| 2013/0039256 A1* | 2/2013 | Shin et al. | 370/315 |
| 2013/0142106 A1* | 6/2013 | Zhang et al. | 370/315 |
| 2014/0022982 A1* | 1/2014 | Kim et al. | 370/315 |

FOREIGN PATENT DOCUMENTS

| | | |
|---|---|---|
| TW | 201130251 A | 9/2011 |
| WO | WO-2014164064 A1 | 10/2014 |

OTHER PUBLICATIONS

"International Application Serial No. PCT/US2014/020300, Written Opinion mailed Jun. 26, 2014", 5 pgs.

"International Application Serial No. PCT/US2014/020300, International Preliminary Report on Patentability mailed Sep. 24, 2015", 7 pgs.

"Taiwanese Application Serial No. 103108130, Office Action mailed Oct. 21, 2015", 3 pgs.

* cited by examiner

MILLIMETER-WAVE RELAY DEVICE WITH BOUNDED DELAY AND METHOD FOR RETRANSMISSION OF SYMBOLS

TECHNICAL FIELD

Embodiments pertain to wireless networks. Some embodiments relate to Wi-Fi networks and networks that operate in accordance with one of the IEEE 802.11 standards. Some embodiments pertain to wireless personal area networks (WPANs) and wireless local area networks (WLANs) that use millimeter-wave frequencies to communicate. Some embodiments relate to millimeter-wave networks operating in accordance with the wireless gigabit alliance (WiGig) specification and the IEEE 802.11ad specification for very-high throughput in 60 GHz. Some embodiments relate to millimeter-wave networks that operate in accordance with IEEE 802.15.3 specification for high-rate WPANs.

BACKGROUND

As the demand for wireless services and Internet bandwidth increases, various solutions have been deployed to help meet this demand. Some solutions employ smaller cell sizes but these solutions have several drawbacks including bandwidth and spatial-reuse limitations associated with operating at conventional microwave frequencies and additional delay associated with multi-hop deployments. The millimeter-wave band has the available spectrum and is capable of providing significantly higher-level throughputs than the microwave frequency band.

Thus, there are general needs for wireless networks and methods that provide increased bandwidth for mobile devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
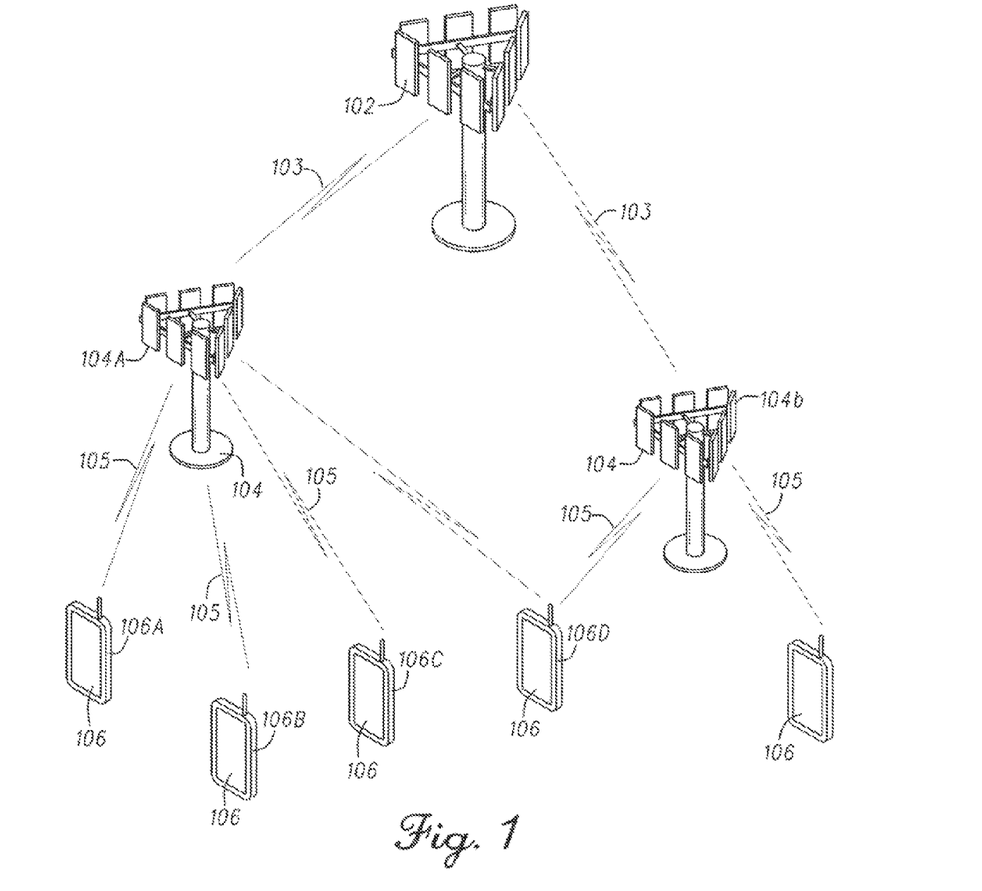
FIG. 1 is illustrates a wireless network in accordance with some embodiments.

FIG. 1 is illustrates a wireless network in accordance with some embodiments. Wireless network 100 may include a master device 102 that may be capable of providing wireless backhaul services to client devices 106. Master device 102 may be coupled to the Internet and may operate as an access point. The transmission and reception of data between the master device 102 and the client devices 106 (e.g., mobile stations) may be provided through intermediate relay devices 104 (e.g., relay devices).

In accordance with embodiments, each relay device 104 may operate as a per-symbol relay for retransmission of symbols between the client devices 106 and the master device 102. In some embodiments, millimeter-wave links 103 and 105 may be used. In these embodiments, a relay device 104 (e.g., relay device 104A) may receive one or more of independent symbol streams from the master device 102. Each independent symbol stream may comprise packets that include groups of one or more symbols where each group within a packet may be destined for a different one of the client devices 106 (e.g., client device 106A, 106B, 106C, 106D). The relay devices 104 may separately decode each symbol or group of symbols (i.e., on a per-client device basis) to generate an independent stream of symbols for retransmission to each associated client device 106 using beamforming. In some embodiments discussed in more detail below, the relay devices 104 may also use spatial multiplexing. The relay devices 104 may be arranged to receive, decode, and retransmit each symbol or group of symbols within a delay that is bounded by the number of symbols in the group. These embodiments are discussed in more detail below.

Figure 2A:
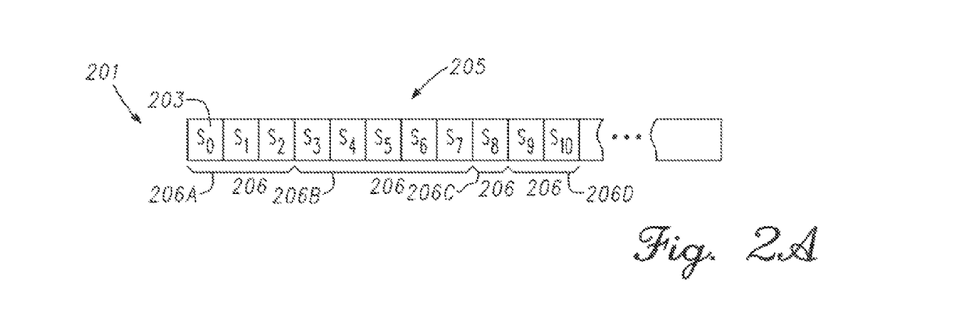
FIG. 2A illustrates a stream of symbols transmitted by a master device in accordance with some embodiments.
Figure 2B:
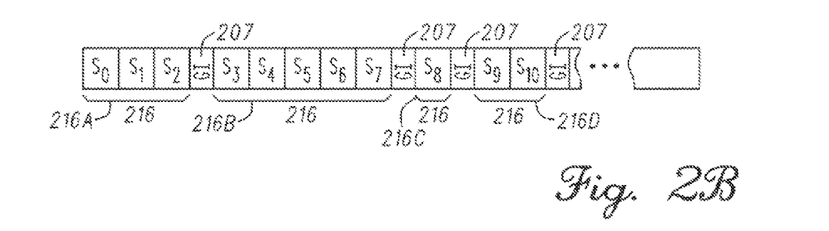
FIG. 2B illustrates a stream of symbols transmitted by a relay device in accordance with some embodiments.

FIG. 2A illustrates a stream of symbols transmitted by a master device in accordance with some embodiments. FIG. 2B illustrates a stream of symbols transmitted by a relay device in accordance with some embodiments. An independent stream 201 of symbols 203 may be transmitted by the master device 102 (FIG. 1) to one or more relay devices 104 (FIG. 1). Each independent symbol stream 201 may comprise packets 205 that include groups 206 of one or more symbols 203. Each group within the packet 205 may be destined for a different one of the client devices 106 (FIG. 1). The relay device 104 may separately decode each symbol 203 or group 206 of symbols to generate independent streams of symbols 216 for retransmission the client devices 106.

In some embodiments, the master device 102 may transmit one or more independent streams 201 of symbols 203 to more than one relay device 104 using spatial multiplexing. In some embodiments, the master device 102 may also employ a multiple-input multiple-output (MIMO) technique. Each independent symbol stream 201 may comprise packets 205 that include groups 206 of one or more symbols 203.

In some embodiments, a method for the transmission and reception of data between a master device 102 and the client devices 106 through intermediate relay devices 104 is provided. In embodiments that use millimeter-wave frequencies (e.g., around 60 GHz), spatial multiplexing of the independent streams 201 of symbols by the master device 102 may include the use a separate spatial channel for each relay device 104 to takes advantage of the propagation characteristics at millimeter-wave frequencies.

In some embodiments, the symbols 203 may be orthogonal frequency division multiplexed (OFDM) symbols and the master device 102, the relay devices 104 and the client devices 106 may communicate in accordance with an IEEE 802.11 technique (e.g., per IEEE 802.11ad) although this is not a requirement.

As discussed above, the relay devices 104 may be arranged to receive, decode, and retransmit each symbol 203 or group of symbols 206 within a delay that is bounded by the number of symbols in the group 206. For groups of one symbol (e.g., group 206C), the delay to receive, decode, and retransmit the symbol may be bounded by one symbol. For groups of more than one symbol (e.g., groups 206A, 206B and 206D), the delay to receive, decode, and retransmit the group is bounded by the number of symbols in the group. For groups of N symbols, the delay to receive, decode, and retransmit the group is bounded by N symbols. N may range from one to ten symbols. These embodiments allow the relay devices 104 to operate as per-symbol relays. In these embodiments, the client devices 106 may receive a disjoint sequence of symbols as the higher layer packet transmitted by the master device 102 may be distributed over multiple disjoint symbols. In some embodiments, the time for a relay device to receive, decode, recode and retransmit a symbol (or group of symbols) does not exceed the symbol length (or the length of the group) in time.

As illustrated in FIG. 2A, the independent symbol stream 201 received at relay device 104A (FIG. 1) may include groups 206 of one or more symbols 203 for different client devices 106 (FIG. 1). For example, group 206A may be intended for client device 106A (FIG. 1), group 206B may be intended for client device 106B (FIG. 1), group 206C may be intended for client device 106C (FIG. 1), and group 206D may be intended for client device 106D (FIG. 1). After separately decoding by the relay device 104A, the relay device 104A may generate independent stream of symbols 216 (see FIG. 2B). Group 216A may be intended for client device 104A and may correspond to group 206A, group 216B may be intended for client device 104B and may correspond to group 206B, group 216C may be intended for client device 104C and may correspond to group 206C, and group 216D may be intended for client device 104D and may correspond to group 206D.

In some embodiments, the relay devices 104 may be arranged to receive a routing schedule from the master device 102. The relay devices 104 may decode the received symbols within the packets 205 (i.e., on a per-symbol or per-group of symbols basis) and extract a spatial stream for each client device 106 for retransmission within the bounded delay based on the routing schedule. The relay devices 104 may dynamically re-beamform between symbols or groups of symbols of a packet based on the routing schedule.

As illustrated in FIG. 2B, each group of symbols 216 transmitted by a relay device 104 may correspond to a spatial stream for a particular client device 106. In these embodiments, the relay devices 104 may dynamically re-beamform between symbols or groups of symbols that are destined from different client devices 106. Dynamic re-beamforming may be performed due to the propagation characteristics of the millimeter-wave links 105 (FIG. 1) that may be used between the relay devices 104 and the client devices 106. In these embodiments, the relay devices 104 may use directional antennas that may be directed to one or more of the client devices 106 using beamforming techniques.

By performing dynamic re-beamforming between symbols or groups of symbols 216 that are destined from different client devices 106, the relay device 104 may be ready to retransmit the next symbol or group of symbols to the next client device 106 (e.g., with minimal delay). In these embodiments, the dynamic re-beamforming may be performed while the symbol or symbols for the next client device 106 are being decoded to help assure that the delay is bounded as discussed above. In these embodiments, the master device 102 may have generated an independent routing schedule for each relay device 104 and may have sent the associated routing schedule to each of the relay devices 104. By using the routing schedule, a relay device 104 knows which client device 106 is to receive the next symbol or group of symbols.

In some embodiments, the routing schedule may indicate which symbols of packets are destined for a particular client device 106. In some of these embodiments, symbol offset locations with packets 205 may be used indicate which symbols 203 or groups 206 of symbols are destined for a particular client device 106.

In some embodiments, the routing schedule may be quasi-static and the relay device 104 may be arranged to use the routing schedule on a repeating basis until it is updated or changed by the master device 102. In some embodiments, the routing schedule may cover a single packet and may be used on a repeating basis for each packet. In other embodiments, the routing schedule may cover a set of packets and may be used on a repeating basis for each set of packets that is received from the master device 102. In these embodiments, the symbol offset locations may be viewed as creating virtual channels that persist over multiple physical packets. For example, the first symbol or group of symbols of every Nth physical packet may be designated for a first client device, the second symbol or group of symbols of every Nth physical packets may be designated for a second client device, etc.

In some embodiments, a relay device 104 may include a guard interval 207 (FIG. 2B) between the retransmissions of the symbols or the groups of symbols 216 to different client devices 106. The guard interval 207 may account, at least in part, for latency associated with the dynamic beamforming. In these embodiments, the relay devices 104 may be arranged to dynamically re-beamform based on the routing schedule during the guard intervals 207. Dynamic beamforming may include, for example, changing an antenna pattern to direct a transmission to a particular client device 106.

In some embodiments, each symbol 203 of the independent stream 201 received by a relay device may have been sent by the master device 102 using a MIMO technique. The independent stream 201 may also contain multiple spatial streams and each spatial stream may be configurable to have a different modulation and coding scheme (MCS) and may be addressed to a different client device 106. In these embodiments, the relay device 104 may decode each stream independently, and may recode and retransmit the symbols using spatial multiplexing so that multiple client devices can receive symbols independently.

In some embodiments, the same symbols 203 or groups of symbols 206 destined for more than one client device 106 associated with the same relay device 104. In these embodiments, the relay device 104 may decode a symbol designated for multiple client devices 106, and separately recode the symbol for each of the designated client devices 106 (i.e., on a per client device basis). The relay device 104 may transmit the recoded symbols concurrently to the designated client devices 106 using either a spatial multiplexing or MIMO technique. In these embodiments, the routing schedule may indicate that symbols or groups of symbols are destined for more than one client device 106. In some of these embodiments, the symbols designated for multiple client devices may be received from the master device 102 using a higher order MIMO or higher order MCS.

In some embodiments, the relay devices 104 may be configurable to receive symbols or groups of symbols 206 of a same packet 205 from the master device 102 that are encoding with different MCSs. The relay device 104 may also be configurable to retransmit groups of symbols 216 to the client devices 106 using the different MCSs. In other words, each symbol 203 or group of symbols 206 may have been encoded by the master device 102 using a different MCS. Furthermore, each group of symbols 216 retransmitted by a relay device 104 may be transmitted by a different MCS.

In some embodiments, the relay device 104 may perform link adaptation with the master device 102 and the associated client devices 106 for determination of the MCSs. The MCS for symbols or groups of symbols destined for a same client device may be selected (e.g., by the master device 102) based on link characteristics between the relay device 104 and the master device 102, and link characteristics between the relay device 104 and the client device 106.

In these embodiments, the MCSs may be based on channel conditions. In some embodiments, a closed-loop link adaptation technique may be used in which the devices provide feedback based on channel conditions. In some embodiments, the MCS used for symbols or groups of symbols for transmission of the link between the master device 102 and the relay device 104, and the link between the relay device 104 and the client device 106 may be the same and/or may be selected to meet the link characteristics or channel conditions of both links. For example, a maximum MCS that both links could support may be selected for symbols destined for a particular client device.

In some embodiments, closed-loop link adaptation may be performed in both directions (i.e., for the downlink as well as the uplink). In these embodiments, the upstream device may transmit a sounding symbol (or packet) which the downstream device receives and measures (e.g., SNR per spatial degree of freedom), and returns a compressed representation of the measurement (e.g. a set of SNR values per spatial degree of freedom, or a compressed representation of the received channel matrix). This representation may be used to determine an appropriate spatial mode (e.g., spatial multiplexing or beamforming) and the MCS.

In some embodiments, the master device 102 and a relay device 104 may perform per-symbol coding for the groups of one or more symbols that are to be recoded for transmission to the client devices 106. The per-symbol coding and re-coding may include for example, coding using a block or a convolutional code. In these embodiments, the master device 102 may also perform per-symbol coding for the symbols or groups of symbols 206 of the independent stream 201 of symbols 203 that are transmitted to the relay device 104. In some embodiments, a properly terminated convolutional code may be used. In some embodiments, a block code, such as a low-density parity check (LDPC) code, may be used. In the case of individual symbols (i.e., the one-symbol case), an LDPC code with a few block lengths may be used that match the number of bits in a symbol. For example, five block lengths may be used to match five different MCSs so that the coding is optimized for each symbol. In the case of groups of multiple symbols, other block lengths maybe defined or each symbol may be a block code and decoded appropriately.

In some embodiments, convolutional codes may be used for every one symbol and tail biting may be used to reduce overhead. For groups of multiple symbols, the information bit length may be long enough to justify a convolutional code with tail bits. In these embodiments, the signal length may be used to decode all the symbols, knowing the last symbol has the zeros.

In some embodiments, a framing structure may be used to allow the receiver of the receiving device to separate physical-layer service data units (PSDUs) that it sends to a higher layer. A signal field at the start of each decoded octet may be used to provide this information. Alternatively, a framing structure that is independent of symbol boundaries may be used to provide this information.

In some embodiments, interleaving may be performed over a full packet. Once the individual symbols are decoded and reassembled at the receiver then deinterleaving would be done over the entire packet. These embodiments may provide for more time diversity.

As mentioned above, in some embodiments, the links 103 between the master device 102 and the relay device 104 may be millimeter-wave links, and the links 105 between the relay devices 104 and the client devices 106 may also be millimeter wave links. The millimeter-wave links may use millimeter-wave frequencies in the 60 GHz range although other millimeter-wave frequencies may also be used (e.g., as low as 30 GHz to as great as 100 GHz). In these embodiments, the master device 102 and the relay devices 104 may receive and transmit using directional antennas through the application of beamforming techniques.

In some embodiments, a relay device 104 may receive resource requests (or reservation requests) from the client devices 106 and either piggyback the resource requests onto uplink transmissions to the master device 102 or communicate the resource requests using a management frame. In these embodiments, the relay device 104 may either piggyback the resource requests onto IEEE 802.11 quality-of-service (QoS) data frames or communicate the resource requests using an IEEE 802.11 add traffic stream (ADDTS) frame, although the scope of the embodiments is not limited in this respect.

In some embodiments, the relay devices 104 may be arranged to receive uplink data from the client devices 106 during scheduled symbol times for retransmission to the master device 102. In these embodiments, the relay devices 104 may receive groups of one of more symbols from client devices and may retransmit the symbols to the master device 102 within a delay bounded by the number of symbols.

In some embodiments, when a relay device 104 fails to receive data from a client device 106 during a symbol time that is scheduled for the client device, the relay device 104 may substitute its own data for transmission to the master device. The substituted data may be transmitted in accordance with a modulation and coding scheme (MCS) that is scheduled to be used for the client device. In these embodiments, each symbol may be arranged to carry sufficient identification information (e.g., source address or flow ID) such that the source of the transmission (the client device as scheduled or the relay device as substituted) can be determined by the master device 102.

In some embodiments, more than one relay device 104 (i.e., relay device 104A and 104B) may be scheduled to receive data from the same client device 106 (i.e., client device 106D) simultaneously during a symbol for transmission to the master device 102. As illustrated in FIG. 1, relay device 104A and relay device 104B may be scheduled to receive uplink data from client device 106D. The master device 102 may receive these relayed copies (i.e., the same information) from relay devices 104A and 104B independently using a spatial-division multiple access (SDMA) technique. In this way a measure of diversity is provided when one of the relay devices 104 fails to receive a symbol from the client device 106D.

In some embodiments, the master device 102 may target the same client device 106 using more than one relay device 104 for increased diversity gain. In these embodiments, downlink data for the same client device (e.g., client device 106D) may be transmitted in a per-symbol manner in accordance with the teachings above. In these embodiments, two or more of independent symbol streams that are destined from different relay devices 104A and 104B may include concurrently transmitted symbols for the same client device 106D. In this way, the client device 106D may be able to receive the same symbol from two or more relay devices 104A and 104B simultaneously.

Figure 3:
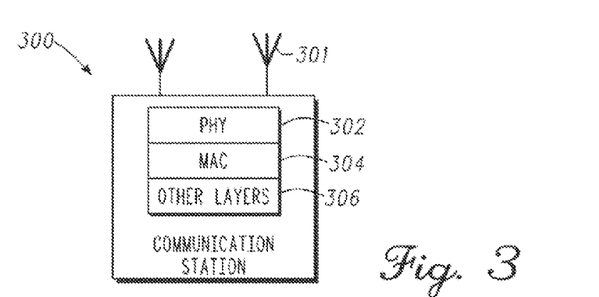
FIG. 3 is a functional block diagram of a communication station in accordance with some embodiments.

FIG. 3 is a functional block diagram of a communication station in accordance with some embodiments. Communication station 300 may be suitable for use as any one of relay devices 104, client devices 106 and master device 102. Communication station 300 may include physical (PHY) layer circuitry 302 for communicating with other devices using one or more antennas 301, media-access control (MAC) layer circuitry 304 for controlling access to the wireless medium, as well as other layer circuitry 306. One or more processors as well a memory may be used to implement the various functional elements of communication station 300. In some embodiments, the physical layer circuitry 302 may include a transceiver for communicating at millimeter-wave frequencies and a transceiver for communicating at RF and microwave frequencies.

In some embodiments, communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, when the communication station 300 is a mobile device, it may include one or more of a keyboard, a display, a non-volatile memory port, multiple antennas, a graphics processor, an application processor, speakers, and other mobile device elements. The display may be an LCD screen including a touch screen.

Antennas 301 may comprise one or more directional or omnidirectional antennas, including, for example, dipole antennas, monopole antennas, patch antennas, loop antennas, microstrip antennas or other types of antennas suitable for transmission of RF or millimeter-wave signals. In some MIMO embodiments, antennas 101 may be effectively separated to take advantage of spatial diversity and the different channel characteristics that may result between each of antennas 101 and the antennas of a transmitting station. In embodiments that perform beamforming at millimeter-wave frequencies, the physical layer circuitry 302 may include a beamformer.

Although communication station 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Figure 4:
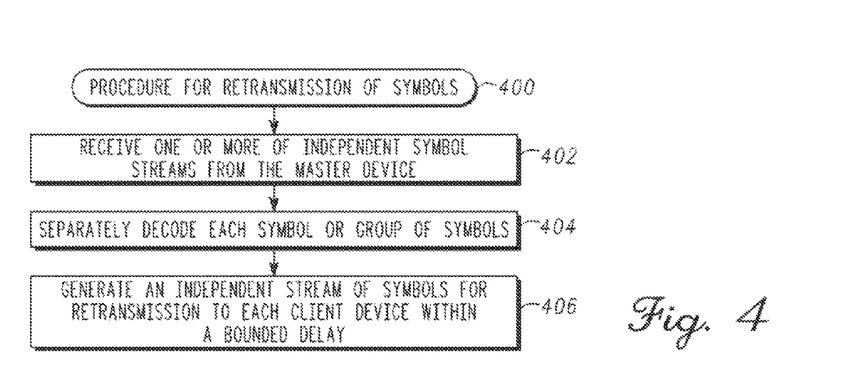
FIG. 4 illustrates a procedure for retransmission of symbols in accordance with some embodiments.

FIG. 4 illustrates a procedure for retransmission of symbols in accordance with some embodiments. Procedure 400 may be performed by a relay device, such as one of relay devices 104 (FIG. 1), for per-symbol relay operations.

In operation 402, one or more of independent symbol streams 201 (FIG. 2) may be received from the master device 102 (FIG. 1). Each independent symbol stream 201 may comprise packets 205 that include groups 206 of one or more symbols 203. Each group within a packet 205 may be potentially destined for a different one of the client devices 106 (FIG. 1)

In operation 404, each symbol 203 or group 206 of symbols may be decoded on a per-client device basis and recoded to generate independent streams of symbols 216.

In operation 406, the independent streams of symbols may be generated from the recoded symbols which may be transmitted to the different client devices 106. The relay device may be arranged to receive, decode, and retransmit each symbol or group of symbols within a delay that is bounded by the number of symbols in the group 206.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

In an example, a wireless station may operate as a per-symbol relay device for retransmission of symbols between client devices and a master device using millimeter-wave links. In this example, the relay device may be arranged to: receive one or more of independent symbol streams from the master device, each independent symbol stream comprising packets that include groups of one or more symbols, each group within a packet being destined for a different one of the client devices; and separately decode each symbol or group of symbols for recoding and retransmission to the client devices using beamforming. The relay device is arranged to receive, decode, recode and retransmit each received symbol or group of symbols within a delay that is bounded by a number of symbols in the group.

In another example, for groups of one symbol, the delay to receive, decode, recode and retransmit the one symbol is no greater than a single-symbol duration, and for groups of N symbols, the delay to receive, decode, recode and retransmit the group is no greater than N symbol durations.

In another example, a wireless station is further arranged to: receive a routing schedule from the master device; decode the symbols received from the master device and extract a spatial stream for each client device for retransmission within the bounded delay based on the routing schedule; and dynamically re-beamform between the symbols or groups of symbols to be transmitted to the client devices based on the routing schedule.

In another example, the routing schedule indicates which symbols of the packet are destined for a particular one of the client devices.

In another example, the routing schedule is quasi-static and the relay device is arranged to use the routing schedule on a repeating basis until updated by the master device.

In another example, the wireless station may include a guard interval between the transmissions of the symbols or the groups of symbols to different client devices, the guard interval to account, at least in part, for latency associated with the dynamic re-beamforming.

In another example, for symbols or groups of symbols received from the master device that are destined for more than one client device associated with the relay device, the relay device is arranged to: decode a symbol or group of symbols designated for multiple client devices; separately recode the symbol or group of symbols for each of the designated client devices; and transmit the recoded symbol or group of symbols concurrently to the designated client devices using either a spatial multiplexing or multiple-input multiple-output (MIMO) technique.

In another example, the relay device is configurable to receive symbols or groups of symbols within the packet from the master device that are encoding with different modulation and coding schemes (MCSs), and the relay device is configurable to retransmit groups of symbols or group of symbols to the client devices using the different MCSs.

In another example, the relay device is arranged to perform link adaptation with the master device and with the associated client devices for determination of the MCSs. The MCS for symbols or groups of symbols destined for a same client device is selected based on link characteristics between the relay device and the master device and link characteristics between the relay device and the client device.

In another example, the wireless station is further configured to perform per-symbol coding for the groups of one or more symbols that are to be recoded for transmission to the client devices.

In another example, the relay device is arranged to receive resource requests from the client devices; and either piggyback the resource requests onto uplink transmissions to the master device or communicate the resource requests to the master device using a management frame.

In another example, the relay device is arranged to receive resource requests from the client devices; and the relay device is arranged to either piggyback the resource requests onto quality-of-service (QoS) data frames or communicate the resource requests using an add traffic stream (ADDTS) frame.

In another example, when the relay device fails to receive data from a client device during a symbol duration that is scheduled for the client device, the relay device is configured to substitute its own data for transmission to the master device, the substituted data being transmitted in accordance with a modulation and coding scheme (MCS) that is scheduled to be used for the client device.

In another example, A method for per-symbol relay operations comprises: receiving one or more of independent symbol streams from a master device, each independent symbol stream comprising packets that include groups of one or more symbols, each group within a packet being destined for a different one of the client devices; and separately decoding each symbol or group of symbols for recoding retransmitting to each client device using beamforming. Each symbol or group of symbols is to be received, decoded, recoded and retransmitted within a delay that is bounded by the number of symbols in the group.

In another example, for groups of one symbol, the delay for receiving, decoding, recoding and retransmitting the one symbol is no greater than a single-symbol duration, and for groups of N symbols, the delay for receiving, decoding, recoding and retransmitting the group is no greater than N symbol durations.

In another example, the method further comprises: receiving a routing schedule from the master device; decoding the symbols received from the master device and extracting a spatial stream for each client device for retransmission within the bounded delay based on the routing schedule; and dynamically re-beamforming between the symbols or groups of symbols based on the routing schedule.

In another example, the method further comprises including a guard interval between the transmissions of the symbols or the groups of symbols to different client devices, the guard interval to account, at least in part, for latency associated with the dynamic re-beamforming.

In another example, a non-transitory computer-readable storage medium that stores instructions for execution by one or more processors to perform operations comprises: receiving one or more of independent symbol streams from a master device, each independent symbol stream comprising packets that include groups of one or more symbols, each group within a packet being destined for a different one of the client devices; and separately decoding each symbol or group of symbols for recoding retransmitting to each client device using beamforming. Each symbol or group of symbols is to be received, decoded, recoded and retransmitted within a delay that is bounded by the number of symbols in the group.

In another example, for groups of one symbol, the delay for receiving, decoding, recoding and retransmitting the one symbol is no greater than a single-symbol duration, and for groups of N symbols, the delay for receiving, decoding, recoding and retransmitting the group is no greater than N symbol durations.

In another example, the instructions further configure the one or more processors to perform operations comprising: receiving a routing schedule from the master device; decoding the symbols received from the master device and extracting a spatial stream for each client device for retransmission within the bounded delay based on the routing schedule; and dynamically re-beamforming between the symbols or groups of symbols to be transmitted to the client devices based on the routing schedule.

In another example, the instructions further configure the one or more processors to perform operations comprising including a guard interval between the transmissions of the symbols or the groups of symbols to different client devices, the guard interval to account, at least in part, for latency associated with the dynamic re-beamforming.

In another example, a wireless communication system to operate as a per-symbol relay device for retransmission of symbols between client devices and a master device using millimeter-wave links, the wireless communication system comprises: one or more antennas to receive one or more of independent symbol streams from the master device, each independent symbol stream comprising packets that include groups of one or more symbols, each group within a packet being destined for a different one of the client devices; and processing circuitry to separately decode each symbol or group of symbols for recoding and retransmission to the client devices using beamforming. The processing circuitry is arranged to receive, decode, recode and retransmit each received symbol or group of symbols within a delay that is bounded by a number of symbols in the group.

In another example, for groups of one symbol, the delay to receive, decode, recode and retransmit the one symbol is no greater than a single-symbol duration, and for groups of N symbols, the delay to receive, decode, recode and retransmit the group is no greater than N symbol durations.

In another example, the processing circuitry is further arranged to: receive a routing schedule from the master device; decode the symbols received from the master device and extract a spatial stream for each client device for retransmission within the bounded delay based on the routing schedule; and perform dynamic re-beamforming between the symbols or groups of symbols to be transmitted to the client devices based on the routing schedule.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless station to operate as a per-symbol relay device for retransmission of symbols between client devices and a master device using millimeter-wave links, the relay device arranged to:
   receive one or more of independent symbol streams from the master device, each independent symbol stream comprising packets that include groups of one or more symbols, each group within a packet being destined for a different one of the client devices; and
   separately decode each symbol or group of symbols for recoding and retransmission to the client devices using beamforming,
   wherein the relay device is configurable to receive symbols or groups of symbols within the packet from the master device that are encoded with different modulation and coding schemes (MCSs),
   wherein the relay device is configurable to retransmit groups of symbols or symbols to the client devices using the different MCSs,
   wherein the relay device is arranged to perform link adaptation with the master device and with the associated client devices for determination of the MCSs,
   wherein the MCS for symbols or groups of symbols destined for a same client device is selected based on link characteristics between the relay device and the master device and link characteristics between the relay device and the client device, and
   wherein the relay device is arranged to receive, decode, recode and retransmit each received symbol or group of symbols within a delay that is bounded by a number of symbols in the group.

2. The wireless station of claim 1 wherein for groups of one symbol, the delay to receive, decode, recode and retransmit the one symbol is no greater than a single-symbol duration, and
   wherein for groups of N symbols, the delay to receive, decode, recode and retransmit the group is no greater than N symbol durations.

3. The wireless station of claim 1 further arranged to:
   receive a routing schedule from the master device;
   decode the symbols received from the master device and extract a spatial stream for each client device for retransmission within the bounded delay based on the routing schedule; and
   dynamically re-beamform between the symbols or groups of symbols to be transmitted to the client devices based on the routing schedule.

4. The wireless station of claim 3 wherein the routing schedule indicates which symbols of the packet are destined for a particular one of the client devices.

5. The wireless station of claim 4 wherein the routing schedule is quasi-static and the relay device is arranged to use the routing schedule on a repeating basis until updated by the master device.

6. The wireless station of claim 3 further arranged to include a guard interval between the transmissions of the symbols or the groups of symbols to different client devices, the guard interval to account, at least in part, for latency associated with the dynamic re-beamforming.

7. The wireless station of claim 6 wherein for symbols or groups of symbols received from the master device that are destined for more than one client device associated with the relay device, the relay device is arranged to:
   decode a symbol or group of symbols designated for multiple client devices;
   separately recode the symbol or group of symbols for each of the designated client devices; and
   transmit the recoded symbol or group of symbols concurrently to the designated client devices using either a spatial multiplexing or multiple-input multiple-output (MIMO) technique.

8. The wireless station of claim 6 further configured to perform per-symbol coding for the groups of one or more symbols that are to be recoiled for transmission to the client devices.

9. The wireless station of claim 6 wherein the relay device is arranged to receive resource requests from the client devices; and
   either piggyback the resource requests onto uplink transmissions to the master device or communicate the resource requests to the master device using a management frame.

10. The wireless station of claim 6 wherein the relay device is arranged to receive resource requests from the client devices; and
    wherein the relay device is arranged to either piggyback the resource requests onto quality-of-service (QoS) data frames or communicate the resource requests using an add traffic stream (ADDTS) frame.

11. The wireless station of claim 6 wherein when the relay device fails to receive data from a client device during a symbol duration that is scheduled for the client device, the relay device is configured to substitute its own data for transmission to the master device, the substituted data being transmitted in accordance with a modulation and coding scheme (MCS) that is scheduled to be used for the client device.

12. A method for per-symbol relay operations comprising:
    receiving one or more of independent symbol streams from a master device, each independent symbol stream comprising packets that include groups of one or more symbols, each group within a packet being destined for a different one of the client devices; and
    receiving symbols or groups of symbols within the packet from the master device that are encoded with different modulation and coding schemes (MCSs);
    separately decoding each symbol or group of symbols for recoding retransmitting to each client device using beamforming;
    retransmitting groups of symbols of symbols to the client devices using the different MCSs;
    performing, link adaptation with the master device and with the associated client devices for determination of the MCSs, wherein the MCSs are based on link characteristics between the relay device and the master device and link characteristics between the relay device and the client device,
    wherein each symbol or group of symbols is to be received, decoded, recoded and retransmitted within a delay that is bounded by the number of symbols in the group.

13. The method of claim 12 wherein for groups of one symbol, the delay for receiving, decoding, recoding and retransmitting the one symbol is no greater than a single symbol duration, and
    wherein for groups of N symbols, the delay for receiving, decoding, recoding and retransmitting the group is no greater than N symbol durations.

14. The method of claim 12 further comprising:
    receiving a routing schedule from the master device;
    decoding the symbols received from the master device and extracting a spatial stream for each client device for retransmission within the bounded delay based on the routing schedule; and dynamically re-beamforming between the symbols or groups of symbols based on the routing schedule.

15. The method of claim 14 further comprising including a guard interval between the transmissions of the symbols or the groups of symbols to different client devices, the guard interval to account, at least in part, for latency associated with the dynamic re-beamforming.

16. A non-transitory computer-readable storage medium that stores instructions for execution by one or more processors to perform operations comprising:
   receiving one or more of independent symbol streams from a master device, each independent symbol stream comprising packets that include groups of one or more symbols, each group within a packet being destined for a different one of the client devices; and
   receiving symbols or groups of symbols within the packet from the master device that are separately decoding each symbol or group of symbols for recoding retransmitting to each client device using beamforming;
   retransmitting groups of symbols or symbols to the client devices using the different MCSs:
   performing link adaptation with the master device and with the associated client devices for determination of the MCSs, wherein the MCSs are based on link characteristics between the relay device and the master device and link characteristics between the relax device and the client device,
   wherein each symbol or group of symbols is to be received, decoded, recoded and retransmitted within a delay that is bounded by the number of symbols in the group.

17. The non-transitory computer-readable storage medium of claim 16 wherein for groups of one symbol, the delay for receiving, decoding, recoding and retransmitting the one symbol is no greater than a single-symbol duration, and
   wherein for groups of N symbols, the delay for receiving, decoding, recoding and retransmitting the group is no greater than N symbol durations.

18. The non-transitory computer-readable storage medium of claim 17 wherein the instructions further configure the one or more processors to perform operations comprising:
   receiving a routing schedule from the master device;
   decoding the symbols received from the master device and extracting a spatial stream for each client device for retransmission within the bounded delay based on the routing schedule; and
   dynamically re-beamforming between the symbols or groups of symbols to be transmitted to the client devices based on the routing schedule.

19. The non-transitory computer-readable storage medium of claim 18 wherein the instructions further configure the one or more processors to perform operations comprising including a guard interval between the transmissions of the symbols or the groups of symbols to different client devices, the guard interval to account, at least in part, for latency associated with the dynamic re-beamforming.

20. A wireless communication system to operate as a per-symbol relay device for retransmission of symbols between client devices and a master device using millimeter-wave links, the wireless communication system comprising:
   one or more antennas to receive one or more of independent symbol streams from the master device, each independent symbol stream comprising packets that include groups of one or more symbols, each group within a packet being destined for a different one of the client devices; and
   processing circuitry to separately decode each symbol or group of symbols for recoding and retransmission to the client devices using beamforming,
   wherein the processing circuitry is arranged to receive symbols or groups of symbols within the packet from the master device that are encoded with different modulation and coding schemes (MCSs),
   wherein the processing circuitry is arranged to retransmit groups of symbols or symbols to the client devices using the different MCSs,
   wherein the processing circuitry is arranged to perform link adaptation with the master device and with the associated client devices for determination of the MCSs,
   wherein the MCS for symbols or groups of symbols destined for a same client device is selected based on link characteristics between the relay device and the master device and link characteristics between the relay device and the client device, and
   wherein the processing circuitry is arranged to receive, decode, recode and retransmit each received symbol or group of symbols within a delay that is bounded by a number of symbols in the group.

21. The wireless communication system of claim 20 wherein for groups of one symbol, the delay to receive, decode, recode and retransmit the one symbol is no greater than a single-symbol duration, and
   wherein for groups of N symbols, the delay to receive, decode, recode and retransmit the group is no greater than N symbol durations.

22. The wireless communication system of claim 21 wherein the processing circuitry is further arranged to:
   receive a routing schedule from the master device;
   decode the symbols received from the master device and extract a spatial stream for each client device for retransmission within the bounded delay based on the routing schedule; and
   perform dynamic re-beamforming between the symbols or groups of symbols to be transmitted to the client devices based on the routing schedule.

* * * * *